(12) United States Patent
Prunera-Usach et al.

(10) Patent No.: US 10,018,087 B2
(45) Date of Patent: Jul. 10, 2018

(54) TURBOMACHINE ACCESSORY GEARBOX EQUIPPED WITH AN AIR/OIL SEPARATOR

(71) Applicant: HISPANO-SUIZA, Colombes (FR)

(72) Inventors: Stephane Prunera-Usach, Rueil Malmaison (FR); Boris Morelli, Paris (FR); Jordane Peltier, Paris (FR)

(73) Assignee: SAFRAN TRANSMISSION SYSTEMS, Colombes (FR)

( * ) Notice: Subject to any disclaimer, the term of this patent is extended or adjusted under 35 U.S.C. 154(b) by 169 days.

(21) Appl. No.: 14/897,627

(22) PCT Filed: Jun. 12, 2014

(86) PCT No.: PCT/FR2014/051447
§ 371 (c)(1),
(2) Date: Dec. 10, 2015

(87) PCT Pub. No.: WO2014/202874
PCT Pub. Date: Dec. 24, 2014

(65) Prior Publication Data
US 2016/0138444 A1    May 19, 2016

(30) Foreign Application Priority Data

Jun. 21, 2013  (FR) .................................... 13 55942

(51) Int. Cl.
*B01D 50/00*  (2006.01)
*F01M 13/04*  (2006.01)
(Continued)

(52) U.S. Cl.
CPC ............. *F01M 13/04* (2013.01); *B01D 45/14* (2013.01); *B01D 50/002* (2013.01); *F02C 7/32* (2013.01); *B01D 46/26* (2013.01); *F01D 25/18* (2013.01); *F01M 2013/0422* (2013.01); *F05D 2250/25* (2013.01); *F05D 2250/36* (2013.01);
(Continued)

(58) Field of Classification Search
CPC .. F01M 13/04; F01M 2013/0422; F02C 7/32; B01D 50/002; B01D 45/14; B01D 46/26; F05D 2260/4031; F05D 2250/36; F05D 2250/25; F05D 2260/609; Y02T 50/671; F01D 25/18
See application file for complete search history.

(56) References Cited

U.S. PATENT DOCUMENTS 4,049,401 A * 9/1977 Smith ................... B01D 45/14
                                                55/401
4,964,898 A * 10/1990 Toda ..................... B01D 45/02
                                                55/323
(Continued)

FOREIGN PATENT DOCUMENTS

EP     2 592 252 A2     5/2013

*Primary Examiner* — Dung H Bui
(74) *Attorney, Agent, or Firm* — Womble Bond Dickinson (US) LLP

(57) ABSTRACT

The invention relates to an accessory gearbox (10) for a turbomachine, said gearbox being equipped with an air/oil separator (12) and comprising a casing (24) in which intermeshing pinions are mounted, one (18) of which is solidly connected to a coaxial shank (22) for driving at least one membrane filter (35) of the separator, characterized in that the membrane filter is mounted directly on a web of the pinion (18) inside the casing.

9 Claims, 3 Drawing Sheets

(51) Int. Cl.
  *B01D 45/14* (2006.01)
  *F02C 7/32* (2006.01)
  *F01D 25/18* (2006.01)
  *B01D 46/26* (2006.01)

(52) U.S. Cl.
  CPC ............... *F05D 2260/4031* (2013.01); *F05D 2260/609* (2013.01); *Y02T 50/671* (2013.01)

(56) References Cited

U.S. PATENT DOCUMENTS

| | | | | |
|---|---|---|---|---|
| 5,114,446 A * | 5/1992 | Giersdorf | ................ | F01D 25/18 55/345 |
| 5,271,245 A * | 12/1993 | Westermeyer | ....... | B01D 50/002 62/470 |
| 5,716,423 A * | 2/1998 | Krul | ....... | B01D 45/14 55/485 |
| 5,776,229 A * | 7/1998 | Blanes | ................. | B01D 45/14 55/407 |
| 6,033,450 A * | 3/2000 | Krul | ....... | B01D 45/14 55/345 |
| 6,398,833 B1 * | 6/2002 | Santerre | ................ | B01D 45/12 55/409 |
| 6,893,478 B2 * | 5/2005 | Care | ....... | B01D 45/14 55/337 |
| 7,063,734 B2 * | 6/2006 | Latulipe | ............. | B01D 50/002 55/337 |
| 7,935,164 B2 * | 5/2011 | Fang | ....... | B01D 45/14 55/385.3 |
| 8,337,581 B2 * | 12/2012 | Dejaune | ............. | B01D 45/14 55/385.1 |
| 8,945,284 B2 * | 2/2015 | Short | ................. | F01D 25/183 55/317 |
| 2012/0102900 A1 * | 5/2012 | Belmonte | ............. | F01D 25/18 55/436 |
| 2013/0042760 A1 * | 2/2013 | Short | ................. | F01M 13/04 95/270 |
| 2013/0112029 A1 * | 5/2013 | Slayter | ................. | F01D 25/18 74/467 |
| 2014/0182253 A1 * | 7/2014 | Zecchi | ................. | B01D 46/26 55/495 |
| 2015/0176447 A1 * | 6/2015 | Beier | ....... | F02C 7/06 415/110 |
| 2016/0158679 A1 * | 6/2016 | Beier | ....... | B01D 45/12 55/462 |

* cited by examiner

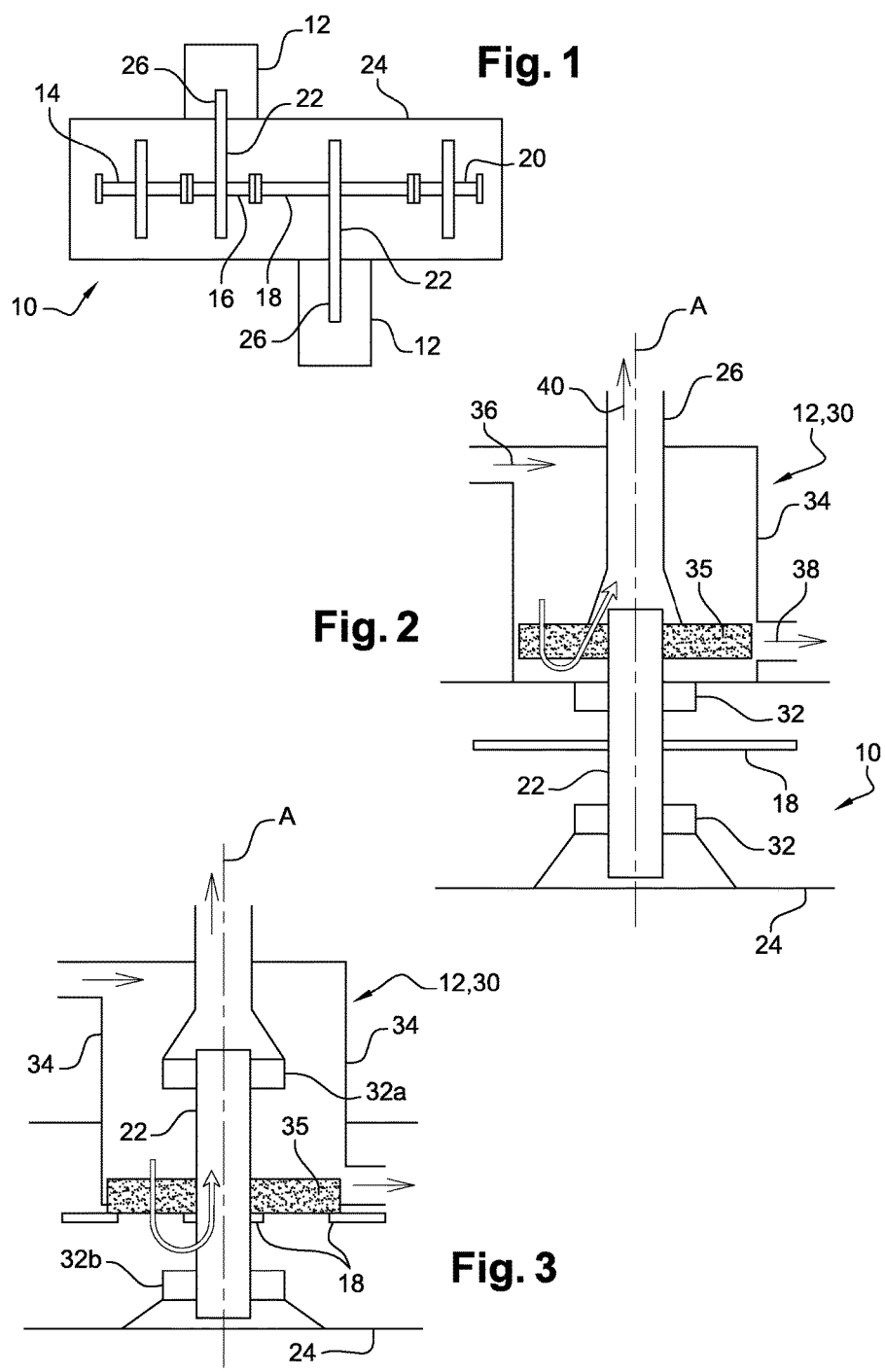

TURBOMACHINE ACCESSORY GEARBOX EQUIPPED WITH AN AIR/OIL SEPARATOR

TECHNICAL FIELD

The present invention relates to an accessory gearbox for a turbine engine, this accessory gearbox, also referred to as an AGB, being provided with an apparatus and in particular an air/oil separator.

PRIOR ART

The continuous search for performance in an aeronautical engine is resulting in integrating the accessory gearbox in an increasingly restricted environment. The overall size of an accessory gearbox contributes to the overall performance of the engine. It therefore becomes necessary to reduce the size of the accessory gearbox and the apparatuses thereof.

An accessory gearbox for a turbine engine is intended to transmit mechanical power originating from the turbine engine to apparatuses such as a pump, an air/oil separator, an electricity generator, etc. The accessory gearbox comprises intermeshing pinions, at least some of which are rigidly connected to coaxial shanks intended to cause the moving parts or rotors of the apparatuses to rotate.

In the prior art, the aforementioned shank of each pinion in the gearbox passes through an orifice in the casing of the accessory gearbox and causes the rotating part of the apparatus to rotate, outside the accessory gearbox.

When the apparatus is an air/oil separator, a mixture of air and oil is introduced into the separator, which is intended to set the mixture into rotation in order to separate the oil from the air by centrifugal effect. The air separated from the oil is then intended to pass through a filtering membrane that is set into rotation by the shank of the pinion and retains the last droplets of oil contained in the air, the filtered air next being routed to an air outlet of the separator. The pinion shank, which cooperates with the apparatus, is rotationally guided by bearings mounted solely in the accessory gearbox.

However, this technology is unsatisfactory since the gearbox and the apparatus are too bulky, which makes it difficult to integrate them in the turbine engine.

The invention provides a simple, effective and economical solution to this problem.

DISCLOSURE OF THE INVENTION

The invention proposes an accessory gearbox for a turbine engine, this gearbox being provided with an air/oil separator and comprising a casing in which intermeshing pinions are mounted, one of which is rigidly connected to a coaxial shank driving at least one filtering membrane of the separator, characterised in that this filtering membrane is directly mounted on a web of the pinion, inside the casing.

According to the invention, part of the apparatus (air/oil separator) is housed in the casing of the accessory gearbox, that is to say is integrated in the accessory gearbox. This is achieved by the fact that the rotating part (the filtering membrane) of the apparatus is housed in this casing at least in part. In other words, unlike the prior art in which the rotating part was situated outside the accessory gearbox, here the rotating part is housed inside the gearbox. This makes it possible to simplify the apparatus, for example by omitting the drive shaft of the rotating part of the apparatus of the prior art, and the guide bearings thereof (in the case of an air/oil separator the rotating part may already be supported by transmission bearings), and results in a saving in weight and a significant reduction in the axial size of the gearbox and of the apparatus (the axis considered here being the rotation axis of the pinion shank and of the rotating part of the apparatus).

According to the invention, the apparatus is an air/oil separator and the rotating part thereof comprises a filtering membrane directly mounted on a web of the pinion, inside the casing. The rotating part of the apparatus can thus be rotationally guided by the guide bearings of the pinion, which makes it possible to improve the reliability of the assembly. The membrane may be applied and fixed to the pinion.

The pinion may comprise teeth connected to the shank of the pinion by arms, for example radial, forming the aforementioned web and defining therebetween openings for the passage of air circulating in the separator.

The membrane may be mounted axially upstream of the web and be intended to have a mixture of air and oil pass through it and to retain the oil of this mixture.

The separator may comprise a casing surrounding at least part of the shank of the pinion and defining a substantially cylindrical internal cavity, and one or more inlets for an air and oil mixture, which inlets are substantially tangential in the cavity.

The casing may comprise, on the internal surface thereof, at least one helical fin for setting the air and oil mixture introduced into the cavity into rotation in order to separate at least some of the oil from the air of the mixture by centrifugal effect.

The shank may be substantially tubular and comprise, on the tubular wall thereof, radial orifices for the passage of air after filtration by the membrane.

A guide bearing of the shank of the pinion is preferably mounted between the shank and a cylindrical rim of a support of the separator, such as a bearing support.

The present invention also relates to a turbine engine, such as a turbojet engine, a turboprop engine or a turbine engine of an aeroplane or helicopter, characterised in that it comprises a gearbox as described above.

DESCRIPTION OF THE FIGURES

The invention will be better understood and other details, features and advantages of the invention will emerge from reading the following description given by way of non-limitative example and with reference to the accompanying drawings, in which:

FIG. 1 is a highly schematic view of an accessory gearbox of a turbine engine, on which two apparatuses are mounted;

FIG. 2 is a highly schematic partial view in axial section of an accessory gearbox equipped with an air/oil separator, and represents the art prior to the invention;

FIG. 3 is a highly schematic partial view in axial section of an accessory gearbox equipped with an air/oil separator, and represents the invention.

DETAILED DESCRIPTION

Figure 4:
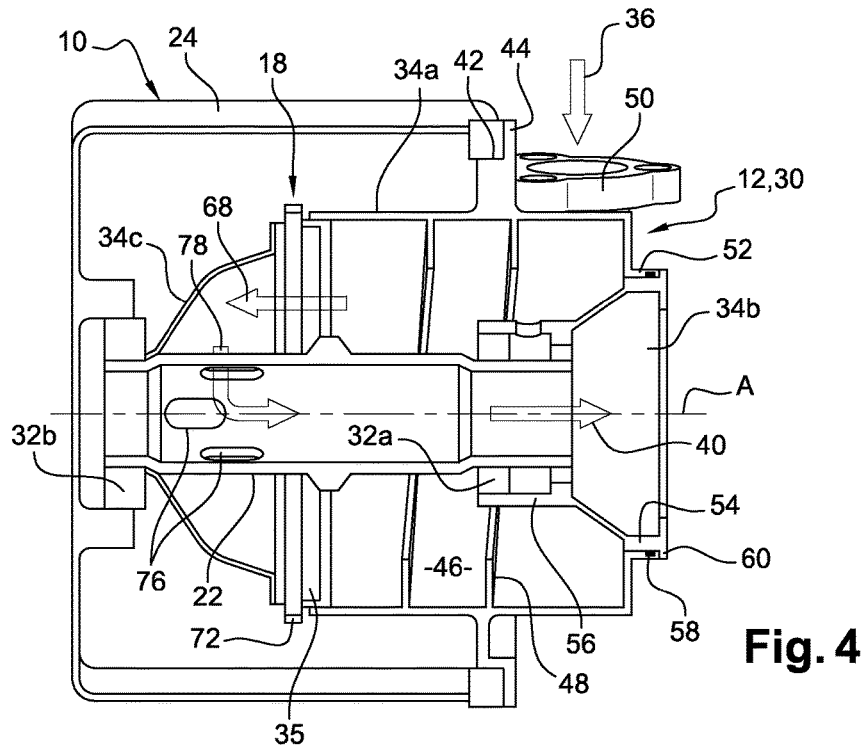
FIGS. 4 to 7 are schematic partial views in perspective, and some in axial section, of an accessory gearbox and of an air/oil separator, according to an embodiment of the invention.

Reference is made first of all to FIG. 1, which depicts highly schematically an accessory gearbox 10 for a turbine engine, such as a turbojet engine, a turboprop engine or a turbine engine of an aeroplane or helicopter, this gearbox 10 being equipped with accessories or apparatuses 12, of which there are two in the example depicted.

The accessory gearbox 10 is intended to transmit mechanical power originating from the turbine engine by means of a radial shaft emerging therefrom, and to transmit said power to the apparatuses, which are pumps, air/oil separators, electricity generators, etc. The transmission takes place through a kinematic chain composed of successive pinions 14, 16, 18, 20, of which there are four in the example depicted.

The pinions 16 and 20 each comprise a coaxial shank 22, which is formed in one piece with the corresponding pinion, and passes through an orifice in the casing 24 of the accessory gearbox. The end part of the shank 22 of a pinion, situated outside the gearbox 10, makes it possible to cause the rotating part of the corresponding apparatus 12 to rotate.

FIG. 2 is a larger-scale highly schematic view of the shank 22 of a pinion 18 of an apparatus 12, which is an air/oil separator 30 here.

The shank 22 of the pinion is centred and rotationally guided by bearings 32 that are mounted in the casing 24 of the accessory gearbox 10. The apparatus comprises a fixed pipe 26 which is coaxial with the pinion 18.

The air/oil separator 30 comprises a cylindrical casing 34 that carries the pipe 26 and surrounds the membrane 35, and inside which a mixture of air and oil is introduced tangentially (arrow 36), which mixture is intended to be set into rotation in the casing 34 in order to separate the oil from the air of the mixture by centrifugal effect, the air depleted of oil next being intended to pass through the membrane 35 such that said membrane retains the droplets of oil remaining in this air. The recovered oil is discharged (arrow 38) and the air separated from the oil is routed via the pipe 26 as far as an air outlet of the separator (arrow 40).

The technology depicted in FIG. 2, which represents the prior art, has the drawback of being axially bulky (axis A). The invention, depicted schematically in FIG. 3, makes it possible to remedy this problem by integrating a part of the apparatus 12, namely the separator 30 in the aforementioned example, in the casing 24 of the accessory gearbox.

This is made possible by housing the rotating part of the apparatus in the casing 24 of the gearbox. In addition, the embodiment described hereinafter allows components of a pinion to be used in operating the apparatus, in particular the fixing of the filtering membrane directly to the web of the pinion and the discharge of the air directly on the tubular shank of the pinion.

In FIG. 3, the filtering membrane 35 of the separator 30 is in fact housed in the casing 24 and fixed to the pinion 18. Part of the casing 34 of the separator is housed inside the space of the casing 24 of the accessory gearbox 10 and furthermore serves as a support for a first guide bearing 32a of the shank 22, another guide bearing 32b of the shank being carried by the casing 24 of the accessory gearbox 10.

Reference is now made to FIGS. 4 to 7, which depict a more concrete embodiment of the invention, and in which the elements already described above are designated by the same references.

The casing 24 of the accessory gearbox 10 is substantially rectangular in cross section, this casing comprising, on one of the walls thereof, an opening 42 having a substantially circular contour for mounting the air/oil separator 30.

The separator 30 comprises a first substantially cylindrical casing 34a that passes through the opening 42 in the casing 24 and comprises a radially external (with respect to the axis A) annular flange 44 for fixing the separator 30 to the casing 24, this flange 44 being applied and fixed by means of the screw and nut type (not shown) on the peripheral edge of the opening 42.

The casing 34a extends around a part of the shank 22 of the pinion 18 and defines an annular cavity 46 around said shank for circulating a mixture of air and oil. The casing 34a comprises, on the internal cylindrical surface thereof, at least one internal helical fin 48 for setting this mixture into rotation around the shank 22.

The separator 30 comprises, at the end thereof situated outside the casing 24, a first pipe 50 for introducing the air/oil mixture (arrow 36), this pipe 50 being rigidly connected to the first casing 34a, and the radially internal passage thereof emerging inside the cavity 46 of the casing 34a. The longitudinal axis of the pipe 50 is oriented tangentially with respect to a circumference centred on the axis A so as to make it easier to set the mixture in the cavity into rotation, the air/oil mixture being intended to rotate about the axis A and move along this axis from the outside towards the inside of the gearbox 10 (from right to left in FIG. 4).

Figure 5:
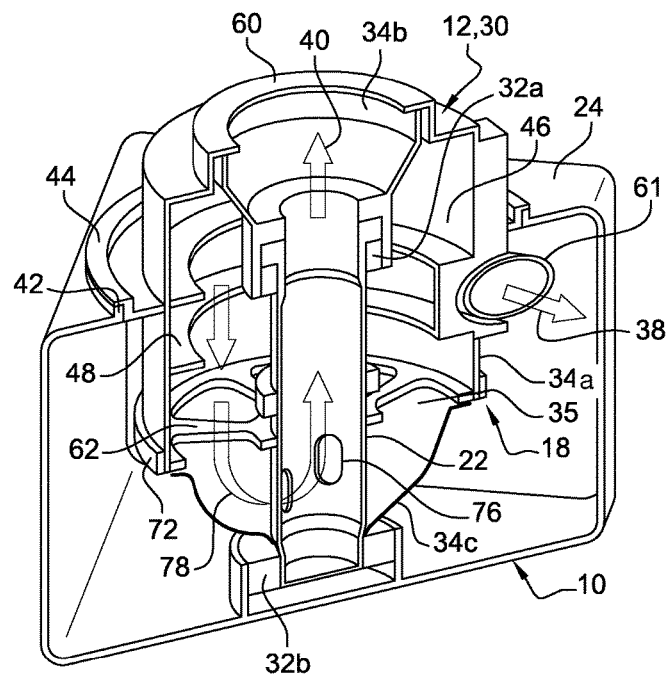
Figure 6:
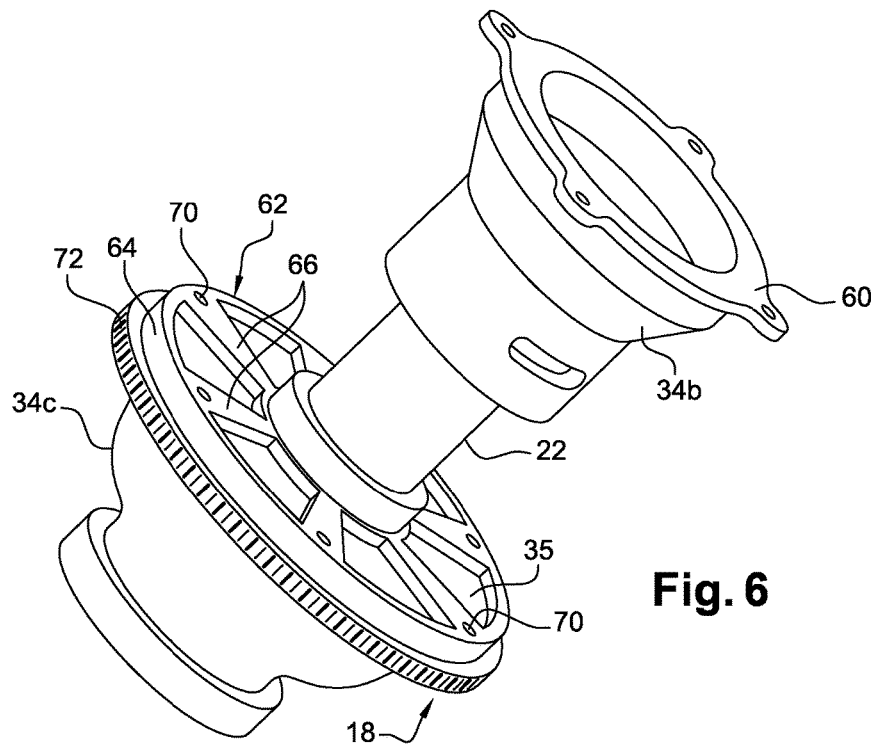
Figure 7:
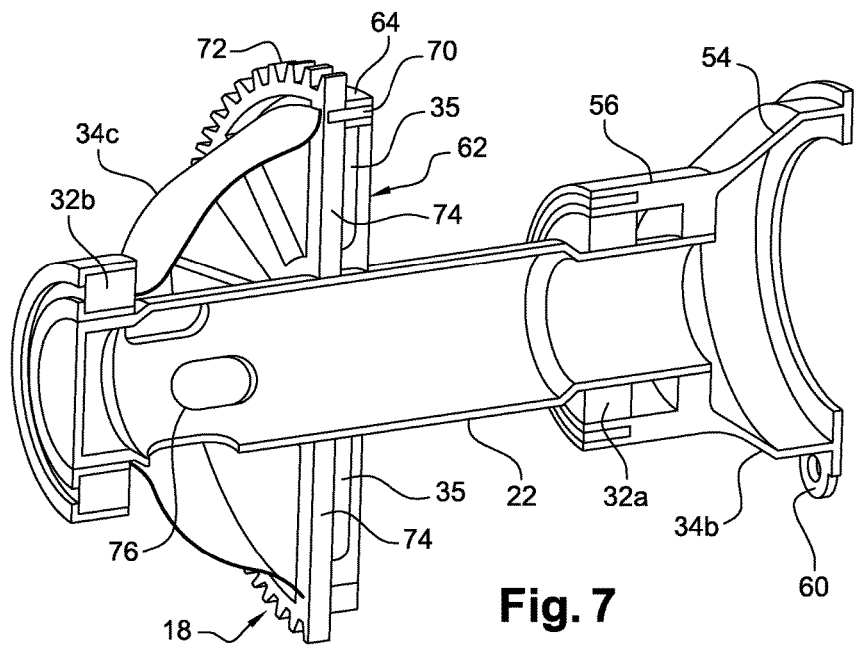

The separator 30 also comprises a second pipe 61 for discharging the oil separated from the air by centrifugal effect (arrow 38), this oil being deposited on the internal surface of the casing 34a and subsequently flowing into the internal passage of the pipe 61, which is also oriented tangentially relative to a circumference centred on the axis A. The second pipe 61 is rigidly connected to the casing 34a and in this case is housed inside the casing 24a of the gearbox 10 (FIG. 5).

The casing 34a comprises, at the end thereof situated outside the gearbox 10, a cylindrical rim 52 for mounting a bearing support 34b of the separator. This support 34b defines an air outlet of the separator 30 after filtration of the aforementioned mixture (arrow 40). This support 34b is annular in shape and comprises a frustoconical wall, the ends of which are connected to cylindrical rims 54, 56 respectively, the rim 54 situated on the side opposite to the gearbox 10 being mounted in the rim 52 of the casing 34a and fixed thereto, and the other rim 56 surrounding the end part of the shank 22 extending outside the casing 24 of the gearbox 10.

An annular gasket 58 is mounted between the rims 52, 54, and the rim 54 is connected at one end, by means of the screw and nut type (not shown), to an external annular fixing flange 60 on the casing 34a.

The guide bearing 32a is mounted between the rim 56 of the support 34b and the aforementioned end part of the shank 22. The other guide bearing 32b of the shank 22 is mounted at the opposite end of the shank and is fixed to the casing 24 of the gearbox 10.

The casing 34a and the support 34b are fixed and form the stator of the separator 30. The end of the casing 34a opposite to the pipe 50 and to the support 34b surrounds a disc 62 supporting the filtering membrane 35, this disc being mounted and fixed on the web of the pinion and forming, together with the filtering membrane 35, the pinion 18 and the shank 22 thereof, the rotor of the separator 30. The membrane 35 comprises for example a block of alveolar material such as a foam.

The disc 62 comprises a hub fixed to the web of the pinion, an annular ring 64 surrounding the hub, and radial arms 66 for connecting the hub to the ring. The arms 66 define therebetween axial openings for the passage of the air circulating in the cavity 46, which air has been depleted of oil by centrifugal effect (arrow 68), as explained above.

In operation, the disc 62 turns inside the casing 34a, said casing sliding on the external periphery of the ring 64 of the disc 62. Dynamic sealing (comprising for example grooves or recesses) may be provided between the casing 34a and the ring 64 and/or between the shank 22 and the bearing support 34b.

The disc 62 is mounted upstream of the pinion 18 (with respect to the direction of flow of the air—arrow 68) and is fixed thereto by screws 70 that pass through axial orifices of the ring 64 of the disc and of the pinion 18.

The pinion 18 is formed in one piece with the shank 22 and comprises external teeth 72 that are connected to the shank by a web formed by radial arms 74 that define therebetween axial openings for the passage of the aforementioned air (arrow 68). The arms 66, 74 of the disc and of the pinion are substantially axially aligned. The teeth 72 on the pinion 18 are intended to mesh with teeth on another pinion of the accessory gearbox 10.

The separator further comprises a cover 34c which is movable, that is to say forms part of the rotor thereof. This cover 34c is mounted in the casing 24 of the gearbox and has an annular shape extending around the shank 22. Said cover is substantially frustoconical in shape and is mounted downstream of the membrane 35 and of the pinion 18, the larger-diameter upstream end thereof being fixed to the external periphery of the pinion 18 and the smaller-diameter downstream end thereof being fixed to the shank 22. In the example depicted, the screws 70 for fixing the disc 62 pass through the pinion and are screwed into tapped orifices of the cover 34c.

This cover 34c defines an annular enclosure around the shank 22 and downstream of the membrane 35 and of the pinion 18, this enclosure being supplied with the air separated from the oil, that is to say the filtered air emerging from the membrane 35 that is intended to retain the droplets of oil contained in the air that passes through it.

The cover 34c surrounds part of the shank 22, which is tubular and comprises radial through-orifices 76 for the filtered air to pass radially inside the shank (arrow 78). The air that enters the shank 22 is intended to flow inside the shank from downstream to upstream (from left to right in FIG. 4) as far as the open upstream end of the shank so that this air is discharged through the outlet of the separator 30 defined by the support 34b (arrow 40).

The invention claimed is:

1. An accessory gearbox for a turbine engine, comprising:
   a casing;
   an air/oil separator comprising at least one filtering membrane located inside the casing;
   a rotating shank around an axis of rotation;
   at least one pinion mounted inside the casing, said pinion being rigidly connected to the shank and coaxial with the axis of rotation of the shank, said pinion comprising teeth intended to mesh with another pinion of the accessory gearbox, said pinion further comprising a web located between the shank and the teeth;
   wherein said filtering membrane is directly mounted on the web of the pinion.

2. Accessory gearbox according to claim 1, wherein the membrane is applied and fixed to the pinion.

3. Accessory gearbox according to claim 1, wherein the teeth of the pinion are connected to the shank by arms that form the aforementioned web and define therebetween openings for the passage of air circulating in the separator.

4. Accessory gearbox according to claim 3, wherein the membrane is mounted axially upstream of the pinion and is intended to have a mixture of air and oil pass through it and to retain the oil of this mixture.

5. Accessory gearbox according to claim 1, wherein the separator comprises a casing surrounding at least part of the shank of the pinion and defining a substantially cylindrical internal cavity, and one or more inlets for a mixture of air and water that are substantially tangential in the cavity.

6. Accessory gearbox according to claim 5, wherein the casing comprises, on the internal surface thereof, at least one helical fin for setting the mixture of air and water introduced into the cavity into rotation in order to separate by centrifugal effect at least part of the oil from the air in the mixture.

7. Accessory gearbox according to claim 1, wherein the shank of the pinion is substantially tubular and comprises, on the tubular wall thereof, radial orifices for air to pass through after filtration by the membrane.

8. Accessory gearbox according to claim 1, wherein a guide bearing of the shank of the pinion is mounted between the shank and a cylindrical rim of a support of the separator.

9. Turbine engine, such as a turbojet engine, a turboprop engine or a turbine engine of an aeroplane or helicopter, wherein said turbine engine comprises an accessory gearbox according to claim 1.

* * * * *